United States Patent
Morselli et al.

(10) Patent No.: US 10,111,390 B2
(45) Date of Patent: *Oct. 30, 2018

(54) AUXILIARY POWER SYSTEM FOR AN AGRICULTURAL BALER WITH FLYWHEEL START UP

(71) Applicant: CNH Industrial America LLC, New Holland, PA (US)

(72) Inventors: Riccardo Morselli, San Vito di Spilamberto (IT); Didier Verhaeghe, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,641

(22) Filed: Jan. 9, 2017

(65) Prior Publication Data

US 2017/0112068 A1 Apr. 27, 2017

Related U.S. Application Data

(63) Continuation of application No. PCT/EP2015/065354, filed on Jul. 6, 2015.

(30) Foreign Application Priority Data

Jul. 9, 2014 (BE) .................................. 2014/0545

(51) Int. Cl.
*A01F 15/04* (2006.01)
*A01F 15/08* (2006.01)

(52) U.S. Cl.
CPC .......... *A01F 15/0841* (2013.01); *A01F 15/04* (2013.01)

(58) Field of Classification Search
CPC .... A01F 15/0841; A01F 15/04; B30B 9/3007; B30B 9/305

See application file for complete search history.

(56) References Cited

U.S. PATENT DOCUMENTS

| | | | | |
|---|---|---|---|---|
| 3,139,969 A | * | 7/1964 | Sullivan | A01D 87/125 100/188 BT |
| 6,105,353 A | | 8/2000 | Mohr et al. | |
| 2003/0159421 A1 | * | 8/2003 | Trelstad | A01F 15/0841 56/341 |
| 2003/0167939 A1 | | 9/2003 | Roth | |

(Continued)

FOREIGN PATENT DOCUMENTS

| | | | | |
|---|---|---|---|---|
| CA | 2252046 A1 | * | 9/1999 | A01F 15/042 |
| EP | 1 974 601 A1 | | 10/2008 | |
| EP | 2183955 A1 | * | 5/2010 | A01D 41/1274 |

OTHER PUBLICATIONS

Belgium Search Report dated May 4, 2015 for Belgium Application No. 2014/0545 (11 pages).

(Continued)

*Primary Examiner* — John Weiss

(57) ABSTRACT

An agricultural baler is characterized by an APS coupled with a driveline and configured for receiving power from the driveline, storing the power, and transmitting the stored power back to the driveline. An electrical processing circuit which is coupled with the APS is operable to control operation of the APS to rotate the flywheel upon start up of the baler.

15 Claims, 5 Drawing Sheets

(56) References Cited

U.S. PATENT DOCUMENTS

| | | | |
|---|---|---|---|
| 2008/0127839 A1* | 6/2008 | Fahrenbach | B30B 1/14 100/214 |
| 2010/0108413 A1 | 5/2010 | Lang et al. | |
| 2013/0152805 A1* | 6/2013 | Roth | A01F 15/0841 100/35 |
| 2014/0137757 A1 | 5/2014 | Nelson et al. | |
| 2015/0027325 A1 | 1/2015 | Bonte et al. | |

OTHER PUBLICATIONS

International Search Report and Written Opinion dated Sep. 8, 2015 for International Application No. PCT/EP2015/065354 (9 pages).

* cited by examiner

AUXILIARY POWER SYSTEM FOR AN AGRICULTURAL BALER WITH FLYWHEEL START UP

CROSS REFERENCE TO RELATED APPLICATIONS

This is a continuation of PCT application No. PCT/EP2015/065354, entitled "AUXILIARY POWER SYSTEM FOR AN AGRICULTURAL BALER WITH FLYWHEEL START UP", filed Jul. 6, 2015, which is incorporated herein by reference.

BACKGROUND OF THE INVENTION

Field of the Invention

The present invention relates to agricultural balers, and, more particularly, to systems for powering such balers.

Description of the Related Art

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers which extend laterally outward from the sides of the plunger. The rollers on each side of the plunger are received within a respective plunger slot formed in the side walls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

During a compression cycle of the plunger as described above, the plunger moves through a compression stroke as it advances into the main bale chamber, with the highest load on the plunger occurring at the end of each compression stroke. As balers become increasingly larger, the peak loads on the plunger during compression strokes likewise become increasingly larger. One way to compensate for these higher peak loads is to use a larger flywheel coupled with a gearbox which drives the plunger. As the plunger reaches the end of the compression stroke, the momentum of the heavier flywheel helps carry the plunger through the peak load at the end of the compression stroke. If the flywheel is not heavy enough then high loads are transferred back through the driveline to the base unit, which can result in lugging down of the engine onboard the base unit. However, a flywheel which is too large is also undesirable since it typically requires a traction unit with a larger horsepower (HP) rating to start and drive the flywheel forming part of the driveline of the baler. It would be desirable to use a smaller traction unit regardless of the size of the flywheel.

US 2010/0108413 describes a baler having a jog drive system drivingly connected within the primary drive system. This jog drive system serves as a source of power to the various performance systems in the baler when movement of components within the baler is required for maintenance or adjustment. The jog drive system comprises a jog motor which can be in the form of a hydraulic motor, an electric motor or other suitable drive mechanism for slowly rotating the flywheel of the baler and thereby advancing all performance systems. The jog motor can be connected to a hydraulic system of the tractor, to an electric system of the tractor or can be provided with other sources of power input. This jog drive system is foreseen to assist the operator by supplying energy to the system when maintenance or adjustment is needed to the baler.

In EP 1 974 601, a similar auxiliary drive is foreseen which functions as a starting arrangement acting on the main drive of the baler and which is capable of acting as a sole drive of the baler or as a drive assisting the main drive in the first phase of the process of starting the baler. During the starting process, the main drive will accelerate to a higher speed than the auxiliary drive by means of a freewheel arrangement, whereupon the auxiliary drive ceases to have any effect on the remainder of the starting process. This auxiliary drive is used to overcome the problem that sometimes it is difficult to start up the baler and will assist by supplying energy to the baler during this start-up phase, after which it ceases to have any effect.

What is needed in the art is an agricultural baler which can start the flywheel at an initial start up state of the baler, regardless of the size of the traction unit powering the baler.

SUMMARY OF THE INVENTION

The present invention provides an agricultural baler with an auxiliary power system (APS) which uses energy stored in a power storage device to start a flywheel at initial startup of the baler.

The invention in one form is directed to an agricultural baler including a main bale chamber; a plunger reciprocally movable within the main bale chamber during a compression stroke and a return stroke; a flywheel associated with the plunger; and a driveline associated with the flywheel and couplable with a power take-off (PTO) of a traction unit. The baler is characterized by an APS coupled with the driveline and configured for receiving power from the driveline, storing the power, and transmitting the stored power back to the driveline. An electrical processing circuit which is coupled with the APS is operable to control operation of the APS to rotate the flywheel upon start up of the baler.

An advantage of the present invention is that the APS can be used to start rotation of the flywheel from a standstill state.

Another advantage is that a traction unit with a smaller HP rating can be used to start and drive the baler.

Yet another advantage is that the baler can be equipped with a smaller flywheel.

A further advantage is that lower PTO power is required: up to 40%, depending on the duty cycle of the baler.

A still further advantage is that fuel consumption is reduced, since a smaller traction unit may be used.

Another advantage is that the APS results in greater comfort for the operator, since peak impulse loads are not transferred back through the driveline to the traction unit.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
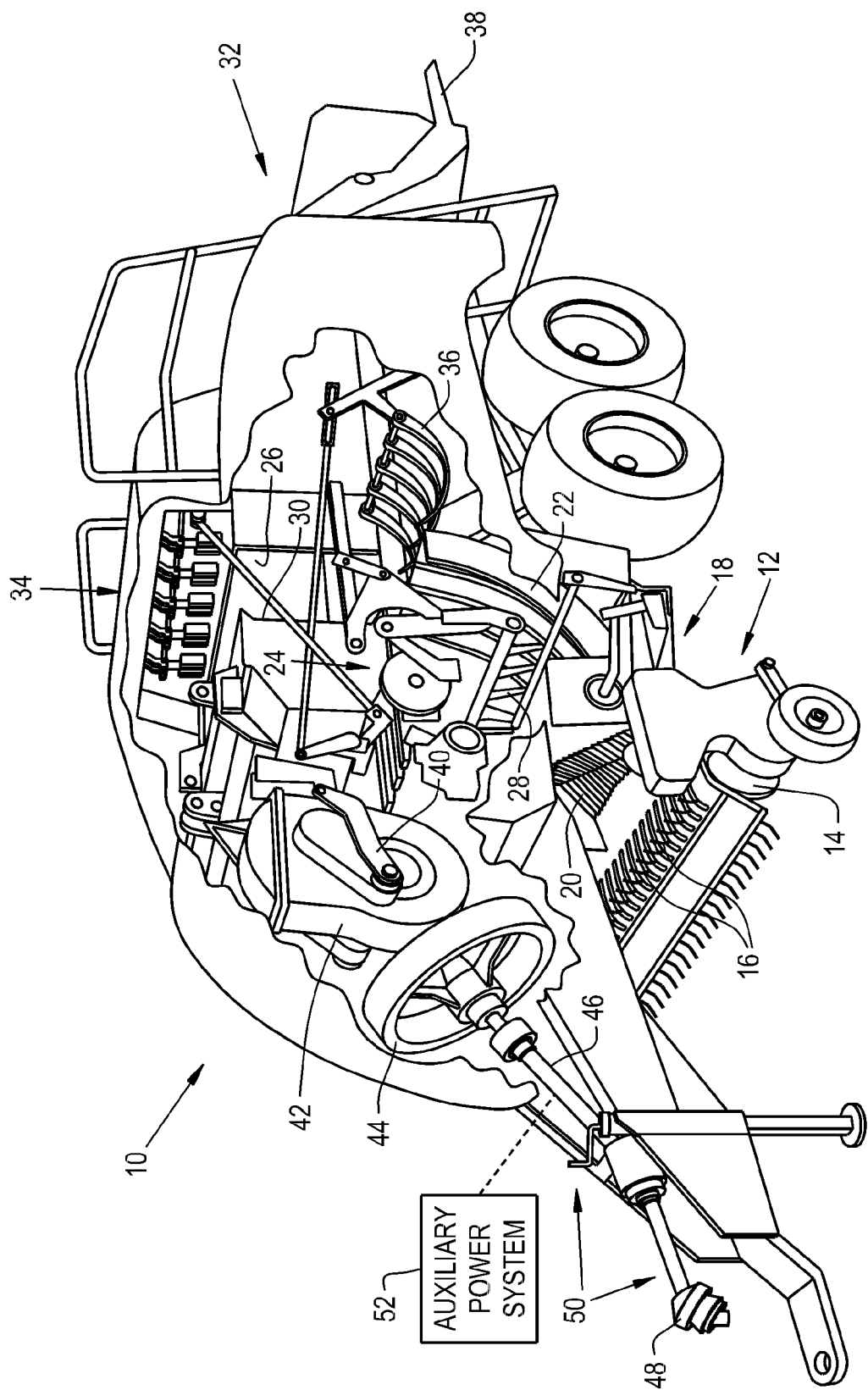
FIG. 1 is a perspective cutaway view showing the internal workings of a large square baler, which may include an APS of the present invention.

Referring now to the drawings, and more particularly to FIG. 1, there is shown a perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank arm 40 with a gear box 42. Gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). PTO coupler 48, drive shaft 46 and flywheel 44 together define a portion of a driveline 50 which provides rotative power to gearbox 42. Flywheel 44 has a sufficient mass to carry plunger 30 through a compression stroke as power is applied to drive shaft 46 by the traction unit. Without the flywheel, a large mechanical load (impulse) is placed on the traction unit as peak power is required by the baler during operation, such as at the end of a compression stroke and/or during a stuffer unit stroke. Generally speaking, as balers become increasingly larger the size of the flywheel also becomes increasingly larger. A larger flywheel also in turn typically requires the use of a traction unit with a higher horsepower rating, to maintain input power to the drive shaft 46 during operation, and since higher power is required to start rotation of the flywheel from an at-rest position.

Figure 2:
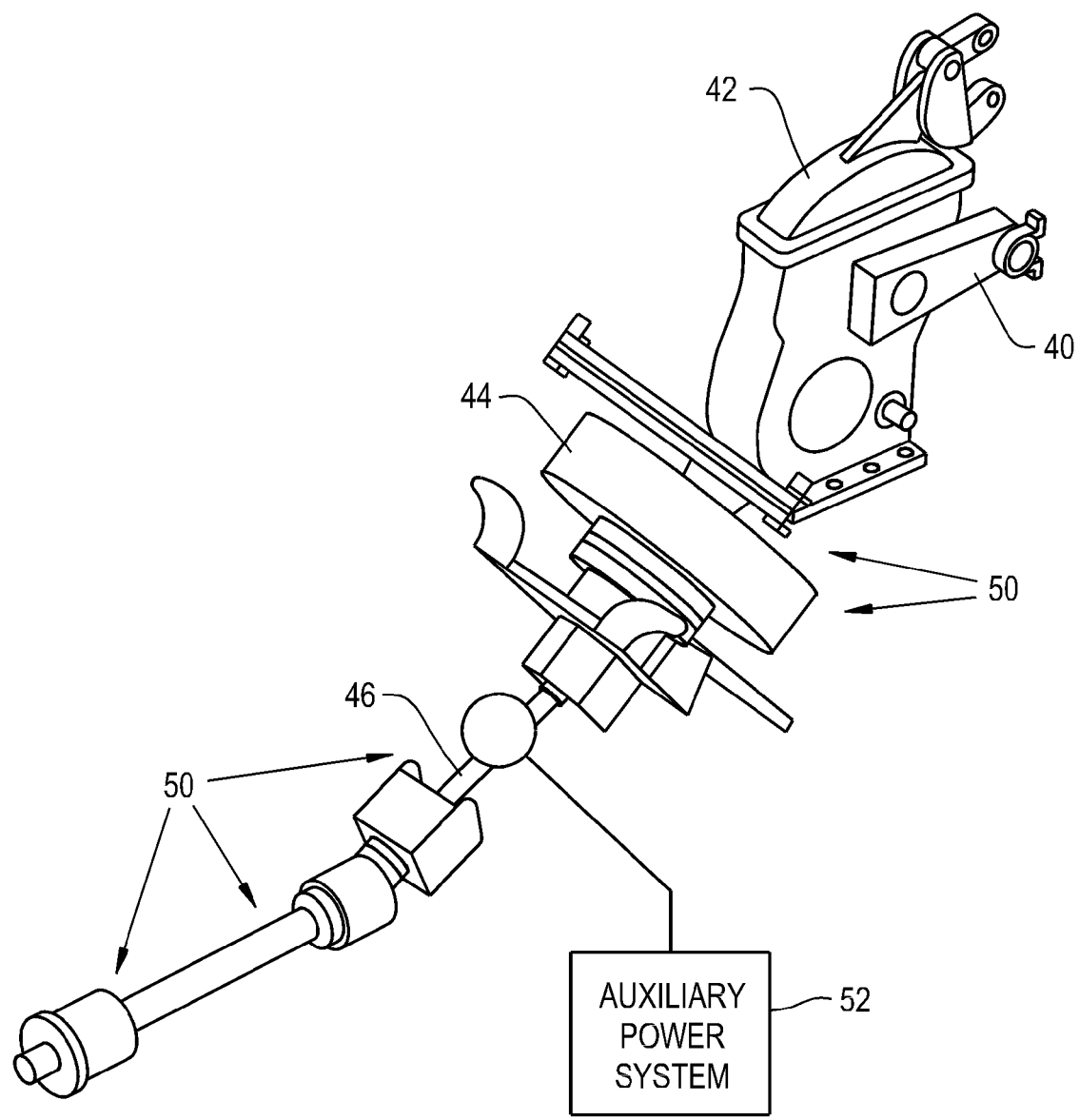
FIG. 2 is a perspective view of the driveline, gearbox and APS shown in FIG. 1.
Figure 3:
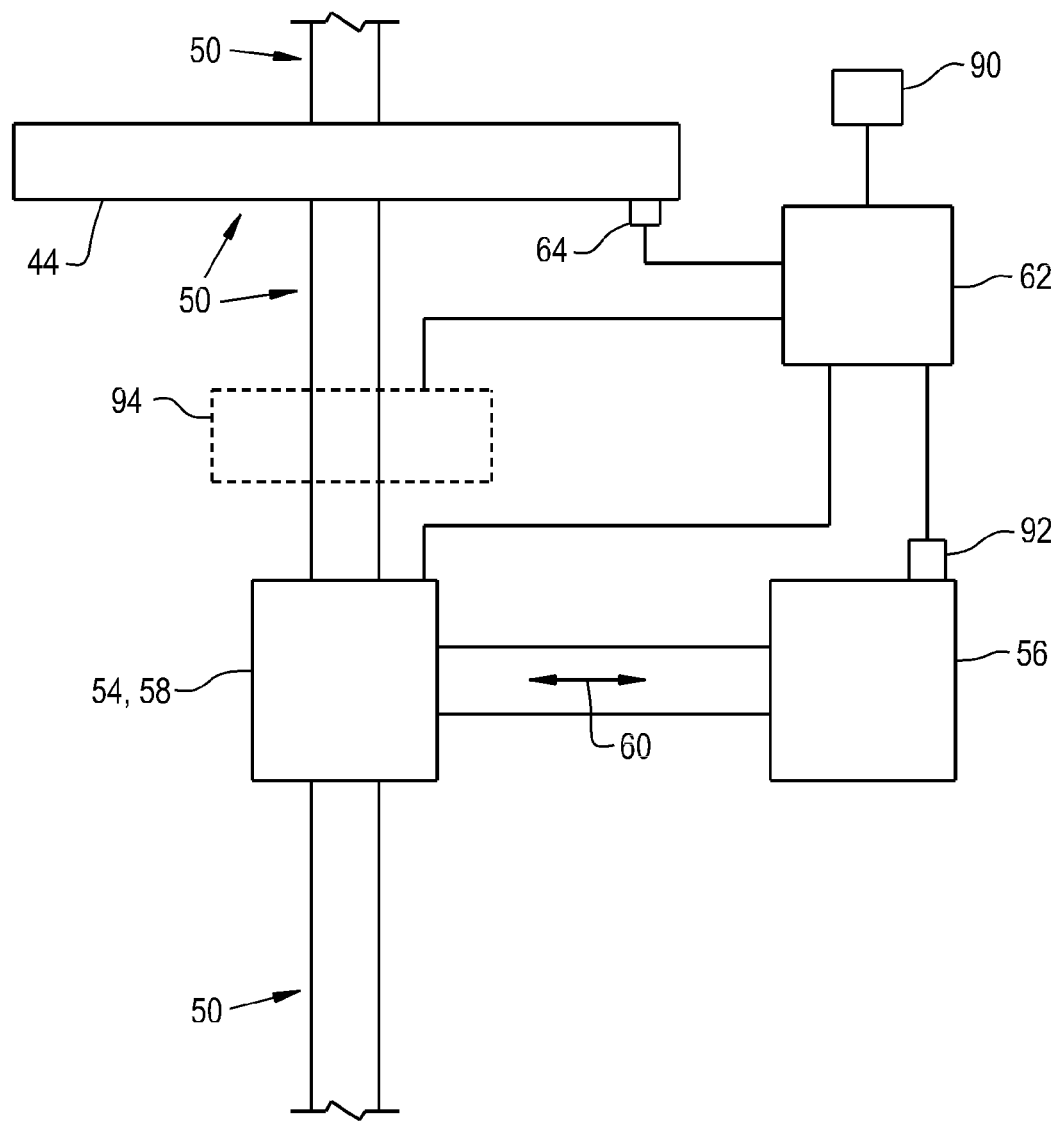
FIG. 3 is a block diagram showing a simplified embodiment of the APS of the present invention.

According to an aspect of the present invention, and referring now to FIGS. 1-3, conjunctively, baler 10 also includes an auxiliary power system (APS) 52 which is coupled with the driveline 50 in parallel with the flywheel 44, in a mechanical power distribution sense and not necessarily a geometric sense. The APS 52 generally functions to receive power from the driveline 50, store the power, and transmit the stored power back to the driveline 50.

APS 52 generally includes a power generation device 54 for receiving power from the driveline 50 and generating power, a power storage device 56 coupled with and storing power from the power generation device 54, and a power feedback device 58 for transmitting the stored power back to the driveline. In the block diagram shown in FIG. 3, the power generation device 54 and the power feedback device 58 are configured as the same unit which can operate with different functionality, such as a hydraulic pump/motor or an electric motor/generator. When configured as a hydraulic pump/motor, the power storage device 56 can be in the form of one or more hydraulic accumulators.

Alternatively, when configured as an electric motor/generator, the power storage device 56 can be in the form of one or more ultracapacitors and/or batteries. With this type of dual functionality, the power storage device 56 is connected with the power generation device 54/power feedback device 58 in a bidirectional manner allowing 2-way flow of power, as indicated by double headed arrow 60.

Alternatively, the power generation device 54 and the power feedback device 58 can be separate and discrete units which are each coupled with the driveline 50 and power storage device 56. For example, the power generation device 54 can be in the form of a hydraulic pump, and the power feedback device 58 can be in the form of a separate hydraulic motor, each of which are mechanically coupled with the driveline 50 and hydraulically coupled with a power storage device in the form of an accumulator (not specifically shown). Moreover, the power generation device 54 can be in the form of an electric motor, and the power feedback device 58 can be in the form of a separate electric generator, each of which are mechanically coupled with the driveline 50 and electrically coupled with a power storage device 56 in the form of an ultracapacitor and/or battery (not specifically shown).

The power storage device 56 shown in FIG. 3 can also be configured differently than one or more hydraulic accumulators, ultracapacitors and/or batteries. For example, the power storage device 56 can be configured as an additional mechanical flywheel which receives/transmits power from/to the driveline 50. The power generation device 54 and the power feedback device 58 can be configured as a continuously variable transmission (CVT), and the additional flywheel would somehow be capable of receiving and storing power during off-peak load periods and transferring the power back to the driveline 50 for use during peak load periods.

For purposes of discussion hereinafter, it will be assumed that the power generation device 54 and the power feedback device 58 are in the form of a singular unit configured as a hydraulic pump/motor. Pump/motor 54, 58 is coupled with and under the control of an electrical processing circuit 62, which can be in the form of an electronic control unit (ECU) or an analog processor. Electrical processing circuit 62 can be a dedicated ECU onboard the baler 10, or can also be part of an ECU used for other purposes onboard the baler 10. Alternatively, electrical processing circuit 62 can also be an ECU onboard the traction unit which tows the baler 10, and can be coupled with the pump/motor 54, 58 and other components onboard baler 10 in a wired or wireless manner.

Electrical processing circuit 62 controls operation of pump/motor 54, 58 in a manner such that power is transmitted to the driveline 50 prior to and during peak load periods on the baler 10, and power is received from the driveline 50 during off-peak load periods on the baler 10. More specifically, power is transmitted to/from the driveline 50 dependent upon a position of the plunger 30 within the main bale chamber 26, and/or a variable associated with the formation of a slice of crop material within the bale chamber 26. To this end, the electrical processing circuit 62 is connected with one or more sensors 64 which provide output signals indicative of the position of the plunger 30 and/or a crop slice variable. In the embodiment shown in FIG. 3, the sensor 64 is positioned adjacent to flywheel 44 to determine the rotational position of the flywheel 44, such as by using a proximity sensor, optical sensor, etc. The position of the flywheel 44 can in turn be used to establish the position of the plunger 30 within the main bale chamber 26. Alternatively, the sensor 64 can be configured to sense a variable associated with crop slice formation within the main bale chamber 26. Examples of crop slice formation variables may include a moisture content of the crop material, a thickness of a given slice of crop material and/or a positional change of the plunger at maximum compression for each slice of the crop material. Alternatively, the variable associated with the crop slice formation can even be an input by a user, such as a particular type of crop material being harvested. Other input variables may also be used for controlling operation of APS 52.

Figure 4:
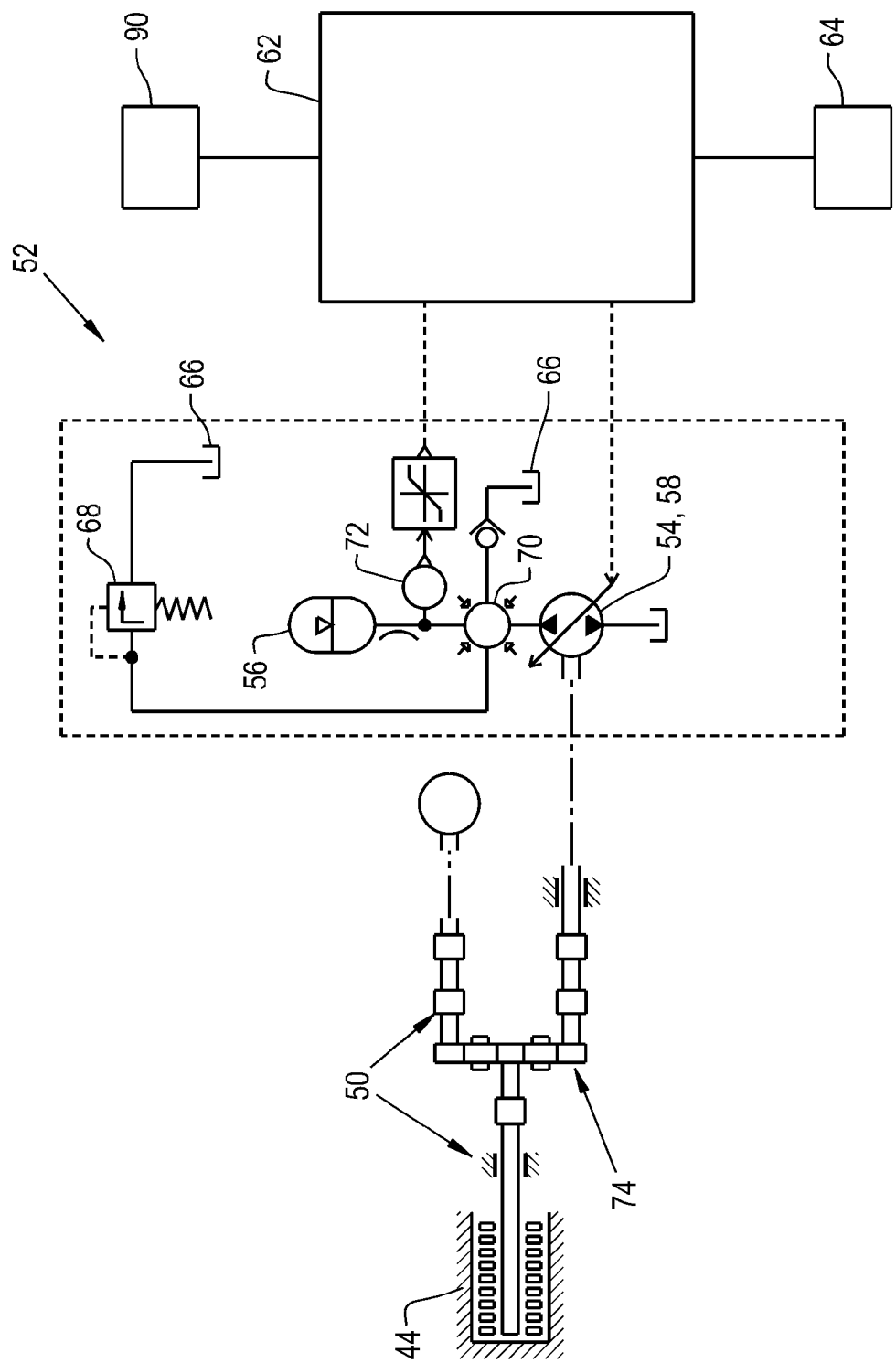
FIG. 4 is a control schematic of an embodiment of the APS of the present invention.
Figure 5:
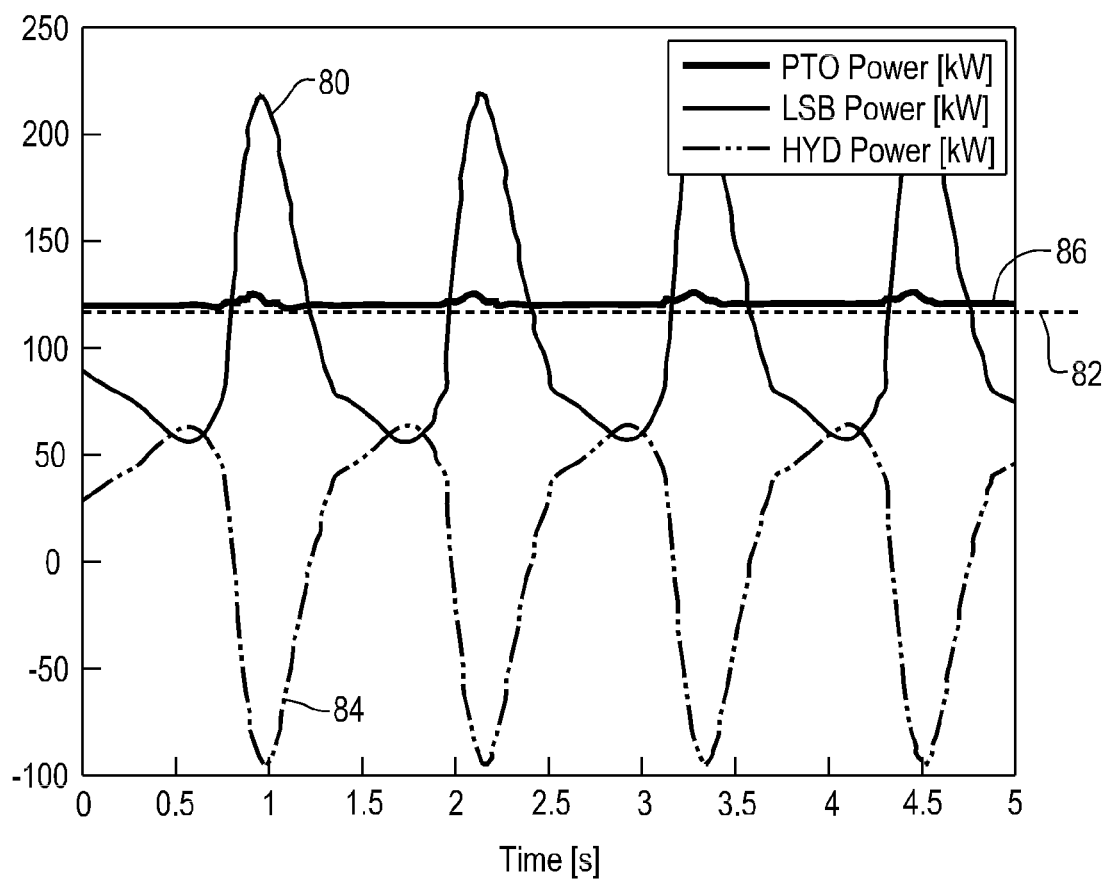
FIG. 5 is a graphical illustration of required power during compression cycles of the baler, hydraulic power input by the APS, and resultant PTO power as a result of the power input by the APS.

Referring now to FIG. 4, there is shown a control schematic of the APS 52 shown in FIGS. 1-3. APS 52 can be thought of as defining a hydraulic flywheel which is based on an over-center variable displacement pump/motor 54, 58 connected between the accumulator 56 and a tank 66. In order to avoid any overpressure, a pressure relief valve 68 is installed between the pump/motor 54, 58 and the accumulator 56. A check valve 70 is also connected to the tank 66 in order to avoid cavitation of the pump/motor 54, 58. A pressure transducer 72 is used to manage the displacement of the pump/motor 54, 58. Basically, during a typical duty cycle, the pump/motor 54, 58 works as a real pump charging the accumulator 56 when the instant power of the baler 10 is lower than the average power (FIG. 5). On the other hand, when the plunger 30 is in a compressing stroke, the pump/motor 54, 58 works as a motor converting hydraulic power into mechanical power that can be provided to the driveline 50. In this way, the typical peak power can be avoided and the PTO power provided from the tractor is always close to the average power. The pump size is a function of the maximum pressure in the accumulator 56 and the operating speed of the pump/motor 54, 58. Because of the additional gearbox 74 coupled with the driveline 50, the pump speed can be increased (e.g., from 1000 RPM (the typical PTO speed during working conditions) up to approximately 2680 RPM). This higher speed allows the use of a smaller pump with a higher hydraulic efficiency and faster response time, in contrast with a larger pump needed when operating at a lower speed condition.

During operation of the baler 10, the plunger 30 reciprocates back and forth during compression cycles within the main bale chamber 26. In the embodiment of the large square baler shown in the graph of FIG. 5, as the plunger 30 reciprocates back and forth (indicated by the top generally sinusoidal curve 80), the power required at the PTO shaft of the large baler can fluctuate between a minimum power requirement up to approximately four times the minimum power requirement (e.g., between approximately 55 and 215 kW). However, the average power indicated by the horizontal dashed line 82 is only about two times the minimum power requirement (e.g., 107 kW). On the other hand, the power provided by the hydraulic pump/motor 54, 58 to the driveline 50 (indicated by the bottom generally sinusoidal curve 84) generally offsets the power fluctuations required at the PTO shaft. Thus, the resultant power required at the PTO shaft is indicated by the generally horizontal line 86 just above the average power line 82.

According to another aspect of the present invention, the electrical processing circuit 62 determines when the PTO has been disengaged, and activates the APS 52 to simultaneously brake the flywheel 44 and store the energy within the power storage device 56 for other purposes. To that end, the electrical processing circuit 62 is coupled with a PTO indicator 90 (FIGS. 3 and 4) providing an output signal indicative of an engagement of the PTO (and thus active mechanical driving of the driveline 50). The electrical processing circuit 62 controls operation of the APS 52, dependent on the output signal from the PTO indicator 90. In one embodiment, the output signal from the PTO indicator 90 represents a disengagement of the PTO, and the electrical processing circuit 62 engages the APS 52 upon receiving the output signal to use energy from the flywheel 44 to store power in the APS 52. At the same time, the APS 52 also functions to brake the flywheel 44 after the PTO is disengaged and the APS 52 is engaged.

The PTO indicator 90 can have different configurations, and can be located onboard the baler 10 and/or the traction unit. For example, it is known that a traction unit in the form of an agricultural tractor can have a manually depressible switch (e.g., knob or lever) that sends a signal to the electronic control unit (ECU) onboard the tractor to disengage the PTO. In one embodiment, the PTO indicator 90 can be this same PTO disengagement switch and the ECU onboard the tractor can provide an output signal (wired or wireless) to the electrical processing circuit 62 associated with the baler 10. The electrical processing circuit 62 then knows that the PTO has been disengaged, and engages the APS 52 to brake the flywheel 44 and store the energy from the flywheel 44 and the power storage device 56 for subsequent use. The manually depressible switch can also be in the form of a virtual switch on a display screen, or other suitable switch which is accessible to the operator of the baler 10.

As another example, the PTO indicator 90 can be in the form of a sensor which senses the rotational speed of the driveline 50 and/or a load (e.g., torque) on the driveline 50. A typical rated operating speed for the driveline of a large square baler is approximately 1000 RPM. If the rotational speed of the driveline 50 falls to a predetermined value, e.g., 850 RPM, then the driveline 50 is slowing down and it can be inferred that the PTO has been disengaged. Alternatively, when the PTO is disengaged, the driveline will freewheel until it comes to a stop and no input torque is applied from the PTO shaft of the tractor. This freewheeling state can be sensed using a load sensor, and an output signal provided to the electrical processing circuit 62 to determine that the PTO has been disengaged. PTO indicator 90 may also be configured in other ways to provide an output signal representing the engagement state of the PTO.

To store a sufficient amount of energy for subsequent uses after the PTO is been disengaged, it may be necessary to provide a larger power storage device 56 and/or multiple power storage devices 56. For example, the power storage device 56 can be configured as one or more hydraulic accumulators, one or more electrical capacitors, one or more electrical batteries and/or one or more additional flywheels.

The energy which is stored within the power storage device(s) 56 can be used for various auxiliary functions onboard the baler 10. For example, such auxiliary functions can include: engaging a bale eject on the baler; raising or lowering a bale discharge chute at the rear of the baler; and/or powering lights onboard the baler. The stored power can also be used for other auxiliary functions onboard the baler 10.

According to another aspect of the present invention, power/energy which is stored in the power storage device 56 can be used to start rotation of the flywheel 44 upon start-up of the baler. The power storage device 56 can be charged at the shut down of the baler 10, as described above, or can be charged at the start up of the baler 10, as described below. Starting the driveline 50 and flywheel 44 from a stand still state at start up can place a significant load on the engine of the traction unit, which can lug down the engine of the traction unit more than acceptable. Since one goal of the APS 52 is to allow the size of the traction unit to be reduced, then the smaller traction unit is even more susceptible to significant lug down at start up of the baler 10. By using the APS 52 to start or assist with the start of rotation of the flywheel 44, the lug down of the engine is minimized.

There are various configurations that would allow the APS 52 to start rotation of the flywheel concurrently with the engagement of the PTO to apply torque to the driveline 50. If the power storage device 56 is charged at shut down of the baler 10, as described above, then the same PTO indicator 90 in the form of an operator depressible knob in the operator cab can be used to manually start rotation of the flywheel 44 concurrently with the PTO engagement. The ECU onboard the traction unit can query the electrical processing circuit 62, which can sense whether the flywheel 44 is at a standstill using sensor 64 and can sense whether the power storage device 56 is charged using a suitable charge state sensor 92 (FIG. 3). The APS 52 can be engaged concurrently with the engagement of the PTO from the traction unit, such that power from the APS 52 is applied to the driveline 50 to assist in the start up of the flywheel 44.

Alternatively, if the flywheel 44 is at a standstill and the power storage device 56 is charged, then the electrical processing circuit 62 can engage the APS 52 to start rotation of the flywheel 44, and after start up send a signal to the ECU onboard the traction unit to engage the PTO. In other words, the start up of the flywheel 44 and the engagement of the PTO (and driveline 50) can occur in a sequential manner. Since the PTO and the driveline 50 are in a freewheeling state prior to engagement of the PTO, it is possible for the APS 52 to drive the driveline 50 for the purpose of starting rotation of the flywheel 44, prior to engagement of the PTO.

Alternatively, if the power storage device 56 is not charged upon start up of the baler 10, then the PTO can be engaged for the purpose of charging the power storage device 56, without driving the flywheel 44, and then the electrical processing circuit 62 can engage the APS 52 to start rotation of the flywheel 44 either prior to or concurrently with engagement of the PTO with the flywheel 44. The driveline 50 would need to include some type of controllable clutch 94 or the like (shown in dashed lines in FIG. 3) under the control of electrical processing circuit 62 to disengage the flywheel 44 while the power storage device 56 is being charged. The clutch 94 can be located between the APS 52 and the flywheel 44. Such a clutch can even be an integral part of the additional gearbox 74 which couples the APS 52 with the driveline 50.

In one configuration, a switch (not specifically shown) which is separate from the PTO engagement knob can be provided in the operator cab to manually charge the power storage device 56 before the PTO is engaged. The ECU onboard the tractor can communicate with the electrical processing circuit 62 onboard the baler 10 (either wired or wireless), the electrical processing circuit 62 can disengage the clutch 94 and communicate back with the ECU, and then the ECU can engage the PTO to charge the APS 52 without driving the flywheel 44. After the power storage device 56 has reached a predetermined charge level, the electrical processing circuit 62 can simply reengage the clutch 94 to drive the flywheel 44. At the same time, the electrical processing circuit can control the APS 52 to apply power to the driveline 50 to assist in starting rotation of the flywheel 44.

Regardless of the particular technique used to start rotation of the flywheel 44, if the APS 52 is first used to start rotation of the flywheel 44 and then the PTO is subsequently engaged, the PTO can be engaged at a predetermined RPM of the flywheel 44. Under most circumstances it is only necessary that the flywheel 44 be rotated to some RPM which is less than the rated PTO speed (e.g., 600 RPM) in order to avoid an excessive load on the engine. However, it is also possible to rotate the flywheel 44 up to any selected speed, including the rated PTO speed which is usually 1000 RPM, and then engage the PTO from the traction unit. The sensor 64 can be used to determine the rotational speed of the flywheel 44 and provide a corresponding output signal to the electrical processing circuit 62.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:
   a main bale chamber;
   a plunger reciprocally movable within the main bale chamber during a compression stroke and a return stroke;
   a flywheel associated with the plunger;
   a driveline associated with the flywheel and couplable with a power take-off (PTO) of a traction unit;
   an auxiliary power system (APS) coupled with the driveline and configured for receiving power from the driveline, storing the power, and transmitting the stored power back to the driveline; and
   an electrical processing circuit coupled with the APS, said electrical processing circuit being operable to control operation of the APS to rotate the flywheel upon start up of the baler.

2. The agricultural baler of claim 1, wherein the APS starts the rotation of the flywheel concurrently with or prior to an engagement of the PTO.

3. The agricultural baler of claim 2, wherein the APS starts the rotation of the flywheel prior to an engagement of the PTO, and the PTO is engaged when the driveline reaches a predetermined rotational speed.

4. The agricultural baler of claim 1, wherein the power storage device is in a charged state at start up of the baler, and the electrical processing circuit is operable to engage the APS with the driveline and use the energy stored in the power storage device to start rotation of the flywheel.

5. The agricultural baler of claim 1, wherein the power storage device is in a discharged or partially discharged state at start up of the baler, and the electrical processing circuit is operable to charge the power storage device prior to engagement of the PTO.

6. The agricultural baler of claim 1, further including a PTO indicator providing an output signal representing an engagement of the PTO, and wherein the electrical processing circuit is operable to start rotation of the flywheel, dependent on the output signal from the PTO indicator.

7. The agricultural baler of claim 6, wherein the PTO indicator includes at least one of:
   an operator depressible switch;
   a rotation speed sensor for the driveline; and
   a load sensor on the driveline.

8. The agricultural baler of claim 6, wherein the APS includes a power storage device and a charge state sensor providing an output signal representing a charge state of the power storage device, and wherein the electrical processing circuit is operable to start rotation of the flywheel, dependent on the output signals from each of the PTO indicator and the charge state sensor.

9. The agricultural baler of claim 6, wherein the APS includes a power storage device, and the electrical processing circuit engages the APS to charge the power storage device, after receiving the output signal.

10. The agricultural baler of claim 9, wherein the power storage device includes at least one of:
    at least one hydraulic accumulator; and
    an additional flywheel.

11. The agricultural baler of claim 10, wherein the APS includes a hydraulic pump/motor for charging the power storage device.

12. The agricultural baler of claim 9, wherein the power storage device includes at least one of:
    at least one capacitor; and
    at least one battery.

13. The agricultural baler of claim 12, wherein the APS includes an electric motor/generator for charging the power storage device.

14. A method of operating an agricultural baler, the baler including a main bale chamber, a plunger reciprocally movable within the main bale chamber during a compression stroke and a return stroke, a flywheel associated with the plunger, and a driveline associated with the flywheel and couplable with a power take-off (PTO) of a traction unit, the method comprising the steps of:
    receiving power from the driveline at an auxiliary power system (APS);
    storing the received power within the APS;
    transmitting the stored power from the APS back to the driveline; and
    rotating the flywheel using the APS upon start-up of the baler.

15. The method of claim 14, wherein the rotating step includes the sub-steps of:
    starting the rotation of the flywheel prior to an engagement of the PTO; and
    engaging the PTO when the driveline reaches a predetermined rotational speed.

* * * * *